(12) United States Patent
Chien et al.

(10) Patent No.: US 8,086,029 B1
(45) Date of Patent: Dec. 27, 2011

(54) AUTOMATIC IMAGE ADJUSTMENT

(75) Inventors: Jen-Chan Chien, Saratoga, CA (US); Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1411 days.

(21) Appl. No.: 11/638,781

(22) Filed: Dec. 13, 2006

(51) Int. Cl.
*G06K 9/00* (2006.01)
(52) U.S. Cl. .......................... 382/162; 382/167
(58) Field of Classification Search .................. 382/162, 382/167, 225, 307
See application file for complete search history.

(56) References Cited

U.S. PATENT DOCUMENTS

| | | | |
|---|---|---|---|
| 5,270,806 A | 12/1993 | Venable et al. | |
| 5,398,308 A | 3/1995 | Kato et al. | |
| 5,506,946 A | 4/1996 | Bar et al. | |
| 5,719,639 A | 2/1998 | Imamura | |
| 5,774,112 A | 6/1998 | Kasson | |
| 5,898,436 A | 4/1999 | Stewart et al. | |
| 6,711,293 B1 | 3/2004 | Lowe | |
| 6,915,021 B2 | 7/2005 | Cannata et al. | |
| 6,980,691 B2 * | 12/2005 | Nesterov et al. | 382/165 |
| 7,358,976 B2 | 4/2008 | Hampshire et al. | |
| 7,359,086 B2 | 4/2008 | Kriss | |
| 7,391,900 B2 * | 6/2008 | Kim et al. | 382/118 |
| 7,593,603 B1 | 9/2009 | Wilensky | |
| 2003/0161529 A1 | 8/2003 | Shimoyama | |
| 2005/0069201 A1 | 3/2005 | Speigle et al. | |
| 2006/0120599 A1 | 6/2006 | Steinberg et al. | |
| 2007/0002153 A1 | 1/2007 | Dierckx | |
| 2007/0086639 A1* | 4/2007 | Sakaida | 382/132 |
| 2008/0013798 A1* | 1/2008 | Ionita et al. | 382/118 |

OTHER PUBLICATIONS

Gooch, Amy A., Olsen, Sven C., Tumblin, Jack, Gooch, Bruce, *Color2Gray: Salience-Preserving Color Removal*, <http://www.cs.northwestern.edu/~ago820/color2gray/> (visited Feb. 22, 2007).
Smith, Lindsay I., *A tutorial on Principal Components Analysis*, tutorial, Feb. 26, 2002.
Gooch, Amy A., Olsen, Sven C., Tumblin, Jack, Gooch, Bruce, *Color2Gray PCA Image Analysis and Projection*, <http://www.cs.northwestern.edu/~ago820/color2gray/Color2GraySupplemental/Attempt1_PCA/pcaResults.html> (visited Feb. 22, 2007).
Gooch, Amy A., Olsen, Sven C., Tumblin, Jack, Gooch, Bruce, *Color2Gray: Salience-Preserving Color Removal*, <http://www.cs.northwestern.edu/~ago820/color2gray/color2gray.pdf> , provided Mar. 5, 2007.
U.S. Appl. No. 11/638,994, filed Dec. 13, 2006, Chien et al.
Cordelia Schmid, et al., "Evaluation of Interest Point Detectors," International Journal of Computer Vision 37(2), pp. 151-172, ©2000 Kluwer Academic Publishers.
David G. Lowe, "Local Feature View Clustering for 3D Object Recognition," Proc. of the IEEE Conference on Computer Vision and Pattern Recognition, Dec. 2001, 7 pages.
David G. Lowe, "Distinctive Image Features from Scale-Invariant Keypoints," Accepted for publication in the International Journal of Computer Vision, 2004, 28 pages.
David G. Lowe, "Object Recognition from Local Scale-Invariant Features," Proc. of the International Conference on Computer Vision, Sep. 1999, 8 pages.
U.S. Appl. No. 11/639,108, filed Dec. 13, 2006.

* cited by examiner

*Primary Examiner* — Phuoc Tran
(74) *Attorney, Agent, or Firm* — Robert C. Kowert; Meyertons, Hood, Kivlin, Kowert & Goetzel, P.C.

(57) ABSTRACT

Automatic image adjustment is described, including performing a principal component analysis (PCA) for a plurality of values to determine a principal component, normalizing the principal component to obtain a normalized principal component, and generating an image by mapping the plurality of values using the normalized principal component.

40 Claims, 9 Drawing Sheets

AUTOMATIC IMAGE ADJUSTMENT

CROSS-REFERENCES TO RELATED APPLICATIONS

This application is related to U.S. patent application Ser. No. 11/639,108, filed on Dec. 13, 2006, and entitled "Automatically Selected Adjusters."

FIELD OF THE INVENTION

The present invention relates generally to software. More specifically, automatic image adjustment is described.

BACKGROUND OF THE INVENTION

Image editing software may be used to view and modify digital images. A digital image may be composed of one or more picture elements (pixels), each having color information. The color information of each pixel may be encoded as a red, green, and a blue component, each having an intensity value of between 0 and 255. The combination of the three components creates an individual color pixel, and several pixels together create a digital image.

Image editing software may be used to perform various modifications to a digital image. For example, image editing software can be used to resize an image, alter colors of an image, change the brightness and other characteristics of an image, or modify selected portions of an image. The image editing software may include various palettes with editing tools that may be used to effect these changes, including palettes having adjusters to change color components for portions of or an entire image.

Image editing software may also be used to convert a color image to a grayscale image. A brightness of each pixel of an image may be determined, for example by averaging the individual red, green, and blue components of a pixel. The brightness can then be applied to a black to white continuum to produce the gray pixel. However, such grayscale converted images often have flat contrast and indistinct shadows and highlights.

Thus, what is needed is a solution for image editing without the limitations of conventional techniques.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to various examples, automatic image adjustment is described. Automatic image adjustment may be performed, for example, in response to a user request to determine automatic color mixing when converting a color image to a grayscale image. Automatic image adjustment may use a principal component analysis (PCA) to determine weights for adjusters in a channel mixer. A PCA may be a process that uses inputted functions and outputs principal components. The PCA may be used to reduce a multidimensional dataset (e.g., a set with multiple color components) to one with fewer dimensions (e.g., a one-dimensional set for grayscale). A channel mixer may be used to alter the intensities of color components (e.g., red, blue, and green) in an image. The channel mixer may include adjusters, which may allow a user to manually change the intensities of the color components in the image. A user may select an automatic adjustment for the image, which may use the PCA to return principal components. The principal components may then be normalized to expand the dynamic range of the image. The normalized principal components may then be used to determine weights for the adjusters. A weight for an adjuster may be used to determine a mix for a color component in an image. The PCA may therefore be used to generate grayscale images with increased contrast and more dynamic intensity ranges.

Image Editor Including Automatic Adjustment

Figure 1A:
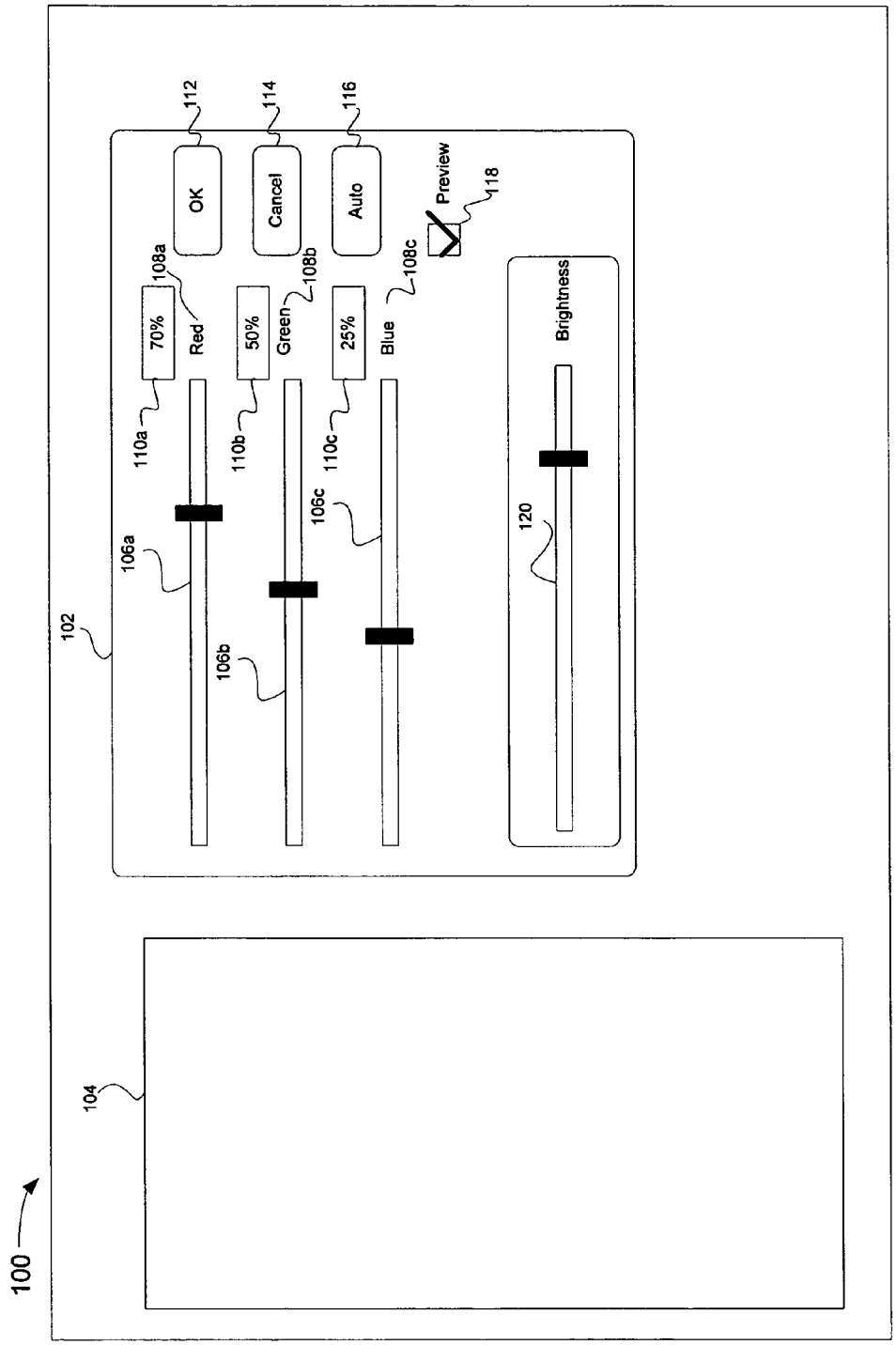
FIG. 1A illustrates an image editor including a three-channel mixer according to various examples.

FIG. 1A illustrates an image editor 100 including a three-channel mixer 102 according to various examples. The image editor 100 may be, for example, image editing software operating on an image 104. The three-channel mixer 102 may be a graphical element used in the image editor 100 to present editing tools and graphs and other information and functions to a user. The image 104 may be, for example, a bitmap image including one or more pixels arranged in a grid. Each of the pixels may include three color components, a red, a green, and a blue (RGB) component, for example. Each of the color components may have an intensity (for example, 0 to 255), and varying levels of intensity for each of the color components may be used to produce various colors. For example, pure red may be given as (255, 0, 0), while white is (255, 255, 255). Other types of images, such as vector images, and other types of color mixing, such as cyan, magenta, yellow, and black (CMYK), and hue, saturation, brightness (HSB), and others are also possible.

The three-channel mixer 102 may operate on the image 104, and may include a set of adjusters 106 (e.g., three adjusters 106a-106c). The adjusters 106 shown here are sliders, but may also be implemented in a user interface to appear and function as dials, buttons, menus or any other type of interface mechanism. According to an example, the adjusters 106 may be used to change the intensity of the mix of primary colors within an image, where each adjuster is used to adjust the intensity of a primary color. The primary colors may be any colors, and the specific colors may be predetermined, for example by the image editor 100 or by a user. For example, the adjuster 106a may be used to adjust the red component of the image 104, the adjuster 106b may be used to adjust the green component of the image 104, and the adjuster 106c may be used to adjust the blue component of the image 104. An RGB or other type of image may be used with the set of adjusters 106. According to other examples, there may be more or fewer adjusters 106. For example, there may be six adjusters 106 for red, yellow, green, cyan, blue, and magenta (see, e.g., FIGS. 1C-1D) or there may be eight adjusters for red, green, blue, yellow, magenta, aquamarine, purple, and orange.

Each of the adjusters 106a-106c may also include a legend 108a-108c, respectively, which names the color the adjuster modifies and may also include a sample (e.g., a square) of the color. Additionally, each of the adjusters 106a-106c may have a corresponding percentage box 110a-110c, respectively, which reports the percentage intensity of each individual color component of the image 104. In some examples, the mix of the colors in the image 104 may be changed using the adjusters 106 or by entering a new percentage into the percentage boxes 110.

In some examples, the three-channel mixer 102 may also include an OK button 112, a cancel button 114, an auto button 116, a preview checkbox 118, and a brightness adjuster 120. The OK button 112 may be selected to make the adjustments indicated in the adjusters 106 to the image 104 and close the three-channel mixer 102. For example, a user may change the position of the adjusters 106, altering the color balance of the image 104, and may select the OK button 112 to make those changes to the image 104. The cancel button 114 may be selected to close the three-channel mixer 102 without making any changes to the image 104. The preview checkbox 118 may be selected to preview the changes made using the adjusters 106 in the image 104. The preview checkbox 118 may be deselected to show the original image 104, before any changes were made using the adjusters 106. The brightness adjuster 120 may be used to make brightness adjustments in the image 104. For example, a change using the brightness adjuster may move each of the adjusters 106 substantially the same amount to change the overall intensity of the image 104.

The auto button 116 may be used to automatically select an adjustment for the image 104 that is reflected in the adjusters 106. The auto button 116 may use a principal component analysis (PCA), for example, to determine an automatic color mix for the primary colors for converting a color image to a grayscale image. Various techniques for determining the weights of each color are described herein (see, e.g., FIGS. 2-4).

The auto button 116 may be used to automatically assign weights for the adjusters 106. When a user selects the auto button 116, the weights of each component of the red, green, and blue channels may be altered for generating a grayscale image. Various techniques for determining the weights may be used, some of which are described below.

Figure 1B:
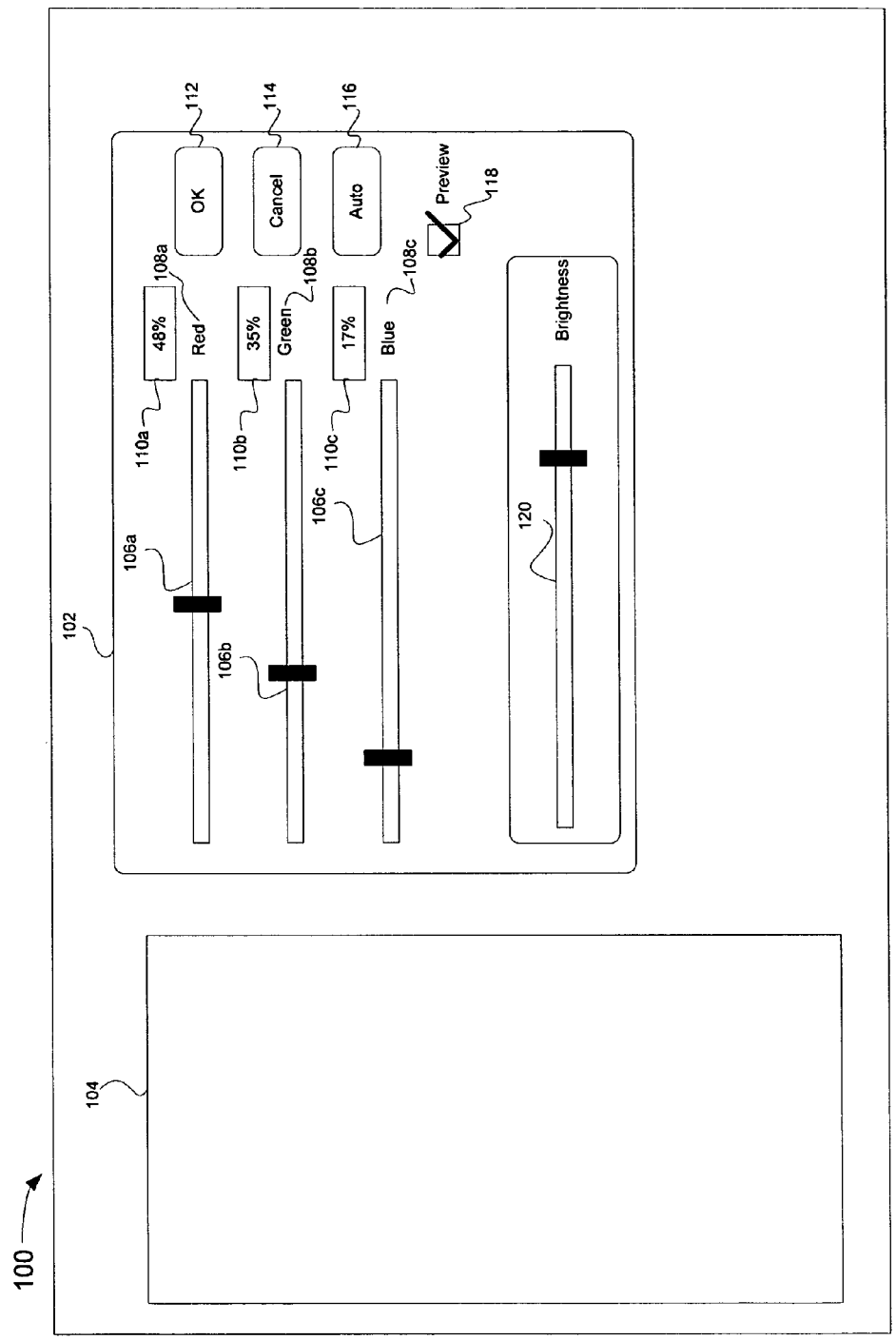
FIG. 1B illustrates the three-channel mixer after the image has been automatically adjusted according to an example.

FIG. 1B illustrates the three-channel mixer 102 after the image 104 has been automatically adjusted according to an example. A user has selected the auto button 116 to, for example, automatically adjust the adjusters 106 of the three-channel mixer 102 to change the color mix of the image 104. The automatic adjustment may be made to produce a grayscale image, for example. As shown here, the adjusters 106 and the mix percentages in the percentage boxes 110 have changed in response to the automatic adjustment.

Figure 1C:
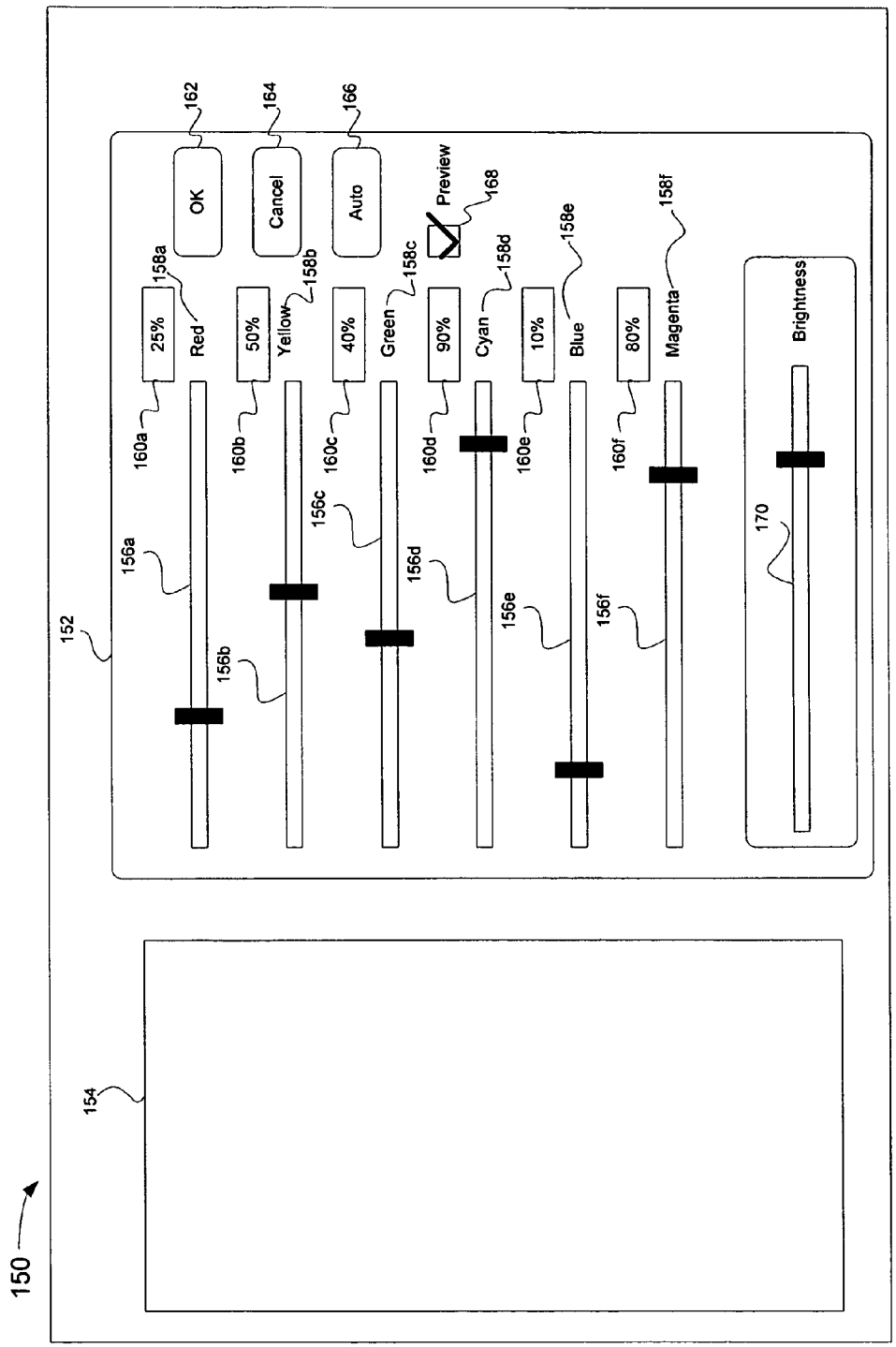
FIG. 1C illustrates an image editor including a six-channel mixer according to various examples.

FIG. 1C illustrates an image editor 150 including a six-channel mixer 152 according to various examples. The six-channel mixer 152 may be used to alter the color mix of an image 154. The image 154 may include one or more RGB pixels, for example. The six-channel mixer may have six adjusters 156, each of which may be used to adjust the intensity (i.e., the color mix) of color components of the image 154.

Each of the adjusters 156 may correspond to a primary color. For example, the adjuster 156a may be used to adjust the red component of the image 154, the adjuster 156b may be used to adjust the yellow component of the image 154, the adjuster 156c may be used to adjust the green component of the image 154, the adjuster 156d may be used to adjust the cyan component of the image 154, the adjuster 156e may be used to adjust the blue component of the image 154, and the adjuster 156f may be used to adjust the magenta component of the image 154. With an RGB image, the yellow, cyan, and magenta components of the image 154 may be adjusted by mixing the red, green, and blue components of the image 154 using interpolation, for example.

Each of the adjusters 156a-156f may also include a legend 158a-158f, respectively, which names the color the adjuster modifies and may also include a sample (e.g., a square) of the color. Additionally, each of the adjusters 156a-156f may have a corresponding percentage box 160a-160f, respectively, which reports the percentage intensity of each individual color component of the image 154. In some examples, the mix of the colors in the image 154 may be changed using the adjusters 156 or by entering a new percentage into the percentage boxes 160.

The six-channel mixer 152 may also include an OK button 162, a cancel button 164, an auto button 166, a preview checkbox 168, and a brightness adjuster 170. The OK button 162, cancel button 164, preview checkbox 168, and brightness adjuster 170 have similar function to the OK button 112, cancel button 114, preview checkbox 118, and brightness adjuster 120, respectively. The auto button 166 may be used to determine an automatic setting for the adjusters 156. With the six-channel mixer 152, the auto button 166 may cause a three-way or a six-way PCA to be performed according to various examples, and as is explained regarding FIGS. 2-4.

Figure 1D:
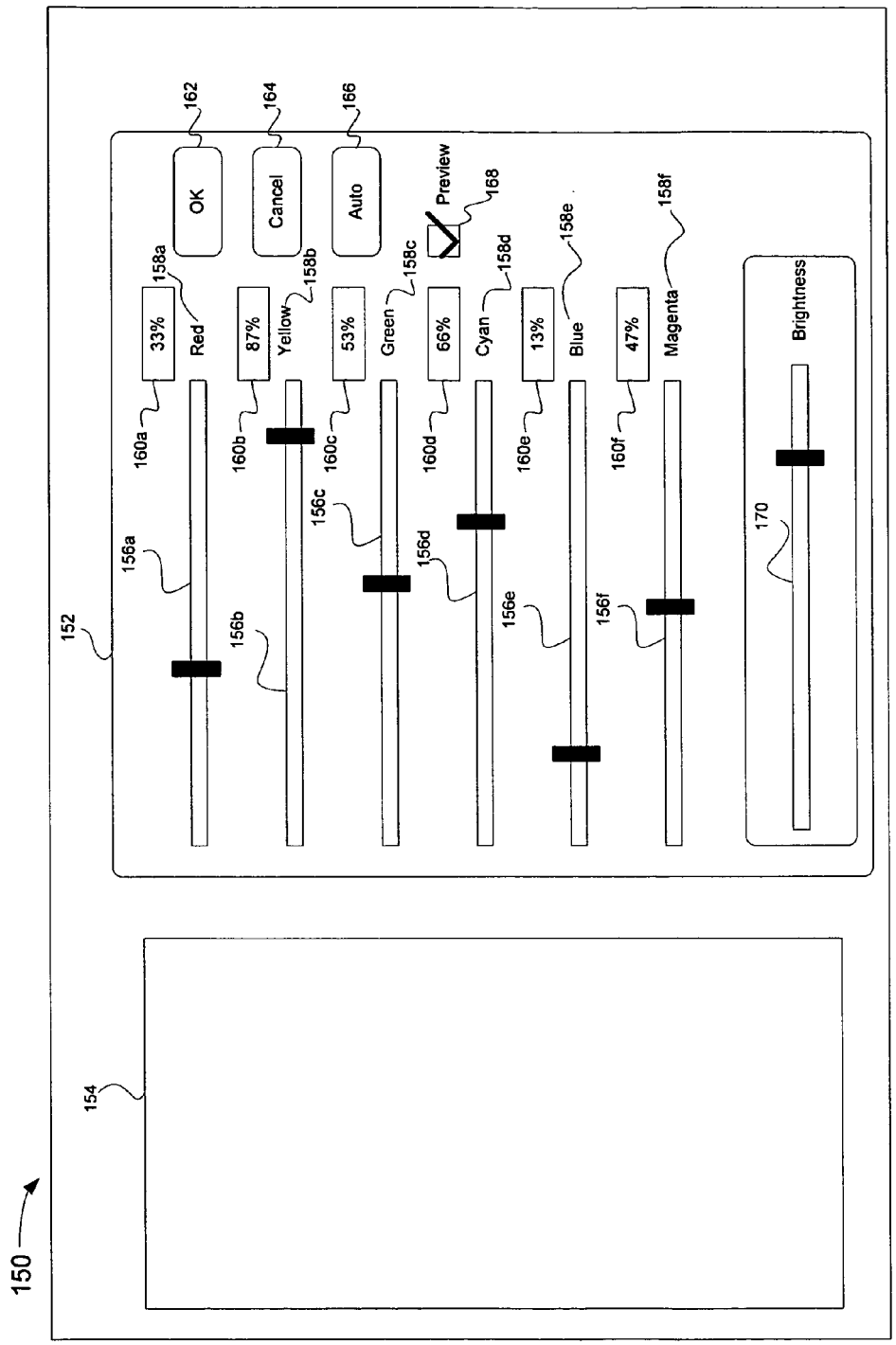
FIG. 1D illustrates the six-channel mixer after the image has been automatically adjusted according to an example.

FIG. 1D illustrates the six-channel mixer 152 after the image 154 has been automatically adjusted according to an example. A user has selected the auto button 166 to, for example, automatically adjust the adjusters 156 of the six-channel mixer 152 to change the color mix of the image 154. The automatic adjustment may be made to produce a grayscale image, for example. As shown here, the adjusters 156 and the mix percentages in the percentage boxes 160 have changed in response to the automatic adjustment.

Other channel mixers are possible. For example, an eight-channel mixer for the colors red, green, blue, cyan, yellow, aquamarine, purple, and orange may be implemented. Any number of adjusters 106 or 156 corresponding to any number of colors may be used with the examples.

Process for Using Principal Component Analysis with an Image

Figure 2:
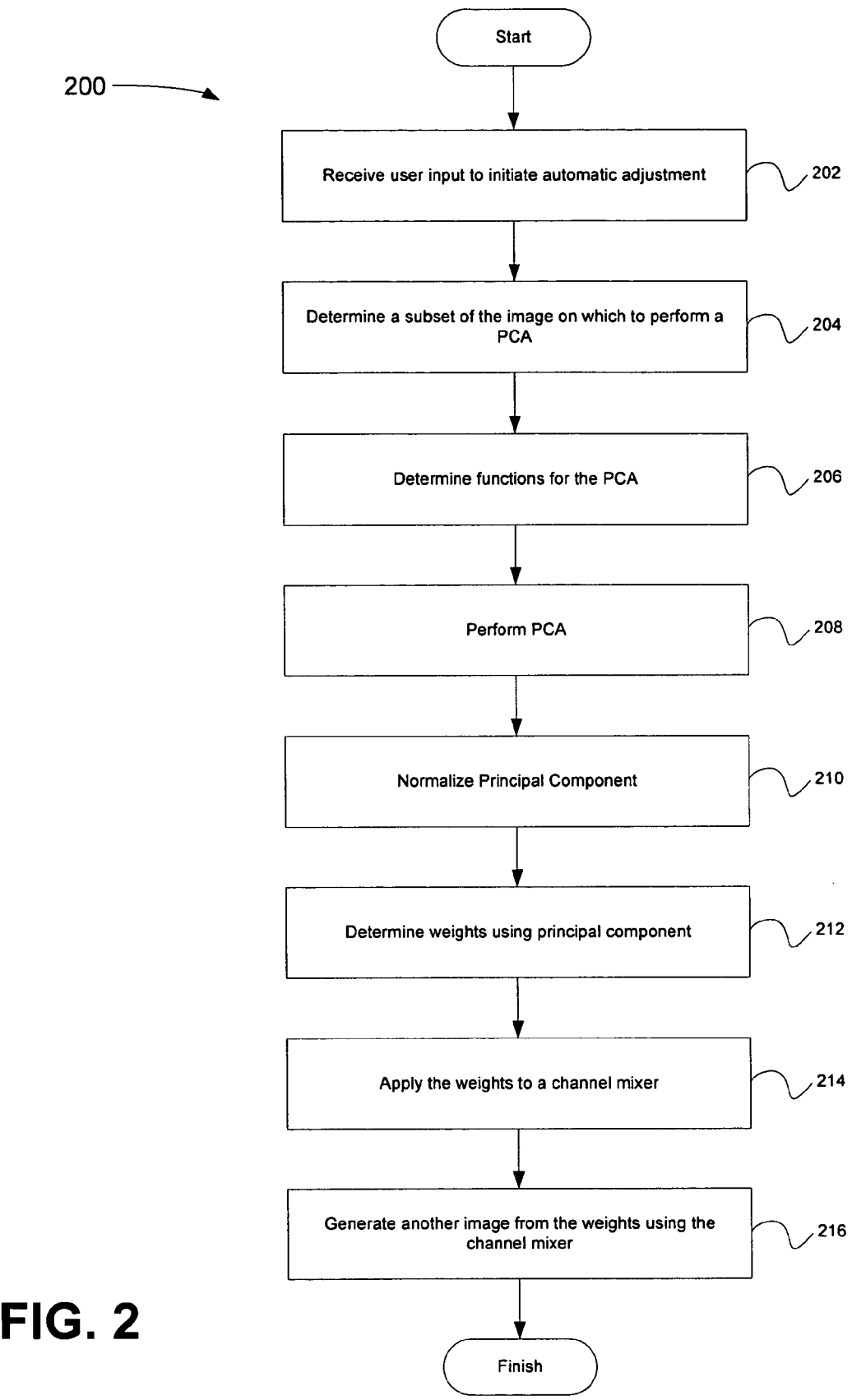
FIG. 2 is a flowchart describing a process for performing an automatic adjustment to an image according to various examples.

FIG. 2 is a flowchart describing a process 200 for performing an automatic adjustment to an image according to various examples. The automatic adjustment may be made to the color mix of an image to be converted to a grayscale image, for example. In operation 202, a user input is received to initiate the automatic adjustment. The user input may be, for example, a mouse click to select one of the auto buttons 116 or 166.

In operation 204, a subset of the image on which to perform a PCA is determined. The subset may be, for example, one million pixels. An image may have any number of pixels, for example 16 million. The image editor may reduce the number of pixels in the image to a representative number to reduce the amount of time needed to perform a PCA for the image. The reduction in pixels may be achieved, for example, by selecting one pixel out of every square of 16 pixels. According to another example, the reduction may not be performed if sufficient processing capability is available.

In operation 206, functions for the PCA are determined. The functions may be used to generate intensity values for the PCA. For example, a function may return the red values of pixels in the subset. According to various examples, any number of functions may be determined, depending on the type of PCA to be performed. For example, a three-way PCA may use three functions, and a six-way PCA may use six functions. Examples of functions to be used with a PCA are described in FIG. 3 for a three-way PCA, and FIGS. 4A-4B for a six-way PCA.

In operation 208, a PCA is performed. The PCA may be used to reduce multiple color components (e.g., red, green, and blue) to a single intensity value (e.g., for grayscale). The PCA may be performed for values (e.g., pixels) of an image to determine a principal component. According to an example, the PCA may be performed by first assuming that the total number of pixels (or values) in the subset is n and that the number of functions (e.g., color components) is m. An n×m matrix may then be generated. The mean value of each color component may be subtracted from the matrix. The PCA may be solved by performing a singular value decomposition on the matrix. According to an example, the highest eigenvalue of the resulting matrix is the principal component of the data set.

In operation 210, the principal components obtained from the PCA are normalized to obtain a normalized principal component. According to various examples, the normalization may be linear or non-linear. A linear normalization may be performed by solving an equation of the form:

$$u_1 + u_2 + u_3 = 1$$

where $u_1$, $u_2$, and $u_3$ are components of the principal component returned by the PCA. According to an example, the PCA may return multiple principal components. For example, a three-way PCA may return three principal components. A principal component of the three principal components may be selected for determining the weights, for example the principal component having the largest eigenvalue. The "principal component" may refer to the principal component that has been selected. For example, the above equation may be used to normalize a three-way PCA that returns a principal component (a vector) having three vector components. A non-linear normalization may take the form of:

$$u_1^2 + u_2^2 + u_3^2 = 1$$

Which may be solved to determine normalized components of the principal component. Normalizations may also use other exponents (e.g., cubed). Normalization may be performed to increase the dynamic range of an image. For example, mapping the results of a principal component analysis to a grayscale image may result in an image having an intensity range between 0 and 100 on a scale of 0 to 255. Normalization may be used to expand the intensity range to the full range of 0 to 255.

According to an example, the principal component of an image may be normalized before the intensity values are mapped using the principal component to generate an image. Performing the normalizing prior to mapping may increase contrast and dynamism of an image. Alternatively, the mapped values may be normalized after the image has been generated.

In operation 212, weights for the adjusters may be determined using the principal component. The weights may be determined, for example, to use the PCA to convert a color image to a grayscale image. A grayscale image may be generated from an RGB image using the following equation:

$$G = Rw_1 + Gw_2 + Bw_3$$

where $w_1$, $w_2$, and $w_3$ are weights, respectively, for each of the red, green, and blue color mixes (e.g., the weights for the adjusters 106). G is a single gray intensity for an individual or a group of pixels (e.g., if G is a vector or matrix). The weights w may depend on the principal component from the PCA, and may be determined as described below regarding FIGS. 2-4.

In operation 214, the weights are applied to the channel mixer. For example, after selecting the auto button 116, the adjusters 106 of the three-way channel mixer 102 may adjust according to the weights determined in operation 212. As a result, in operation 216, another image (e.g., a grayscale image) may be generated from the weights and using the channel mixer. For example, the image may be generated by mapping the values using the weights, which depend on the principal component. The image may be mapped by using the individual components of the principal component, for example.

Three-Way Principal Component Analysis

Figure 3:
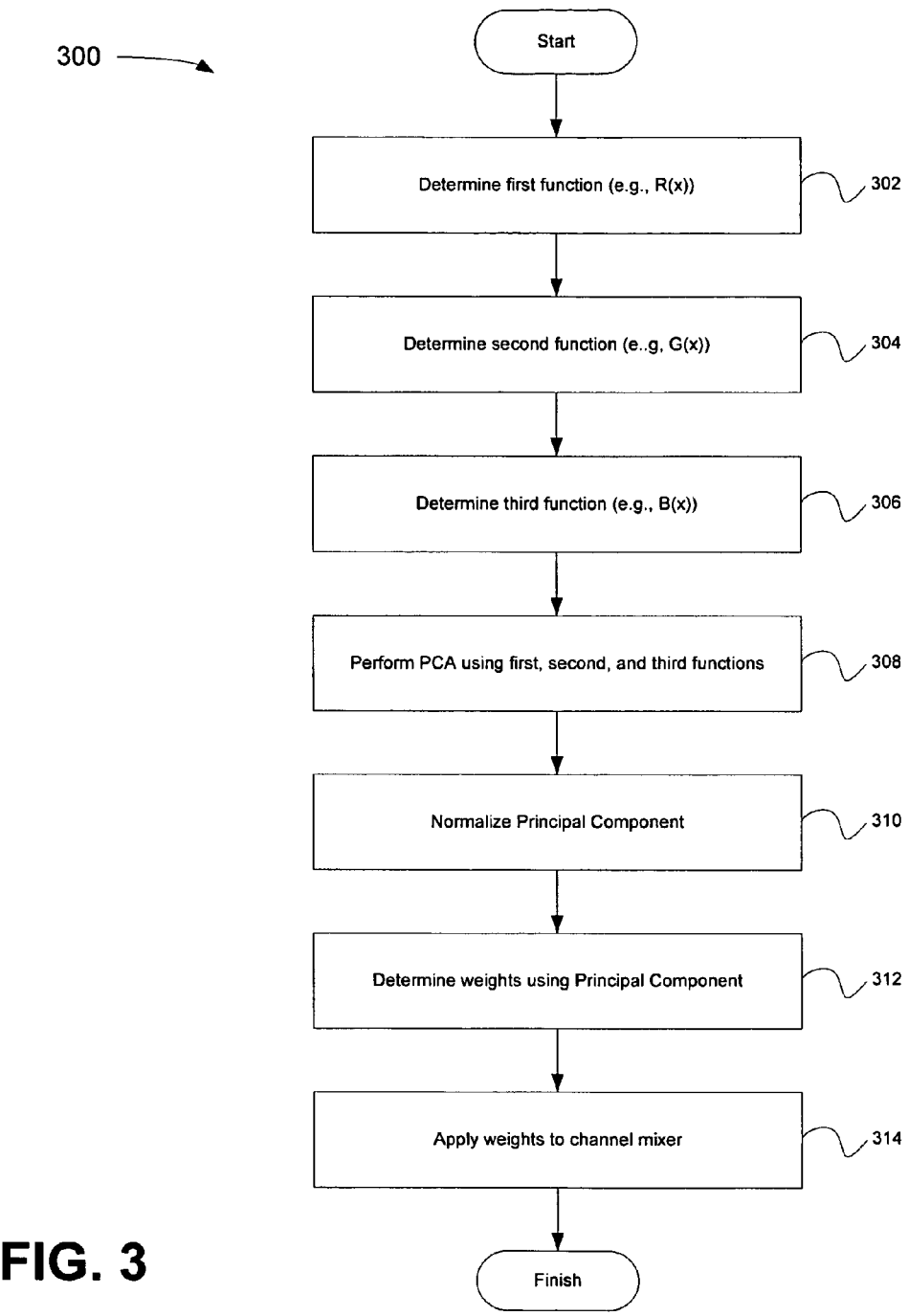
FIG. 3 is a flowchart describing a process for performing a three-way PCA on an image according to various examples.

FIG. 3 is a flowchart describing a process 300 for performing a three-way PCA on an image according to various examples. The three-way PCA may be used with the three-channel mixer 102, for example, to generate automatic adjustments for three channels (e.g., red, green, and blue). The three-way PCA may also be used with the six-channel mixer 152 with linear interpolation to generate adjustments for six, eight, or any number of channels. Accordingly, a mixer having any number of channels may be used with the three-way PCA.

In operation 302, a first function for the PCA is determined. The first function may be, for example, a red function (R(x)) including the red intensity values of the pixels in the image. In operation 304, a second function for the PCA is determined. The second function may be, for example, a green function (G(x)) including the green intensity values of the pixels in the image. In operation 306, a third function for the PCA is determined. The third function may be, for example, a blue function (B(x)) including the blue intensity values of the pixels in the image.

In operation 308, the PCA is performed using the first, second, and third functions. The PCA may be performed as described above. Also as described above, the PCA may return three principal components. A principal component may be selected to determine the weights of the adjusters, for example the principal component having the largest eigenvalue. The "principal component" refers to this selected principal component. The PCA returns a principal component having three components corresponding to the three functions. For example, the PCA may return a principal component having a red component, a green component, and a blue component. The principal component may be a vector taking the form of (R, G, B), for example. In operation 310, the components of the principal component are normalized. The principal components may be normalized using, for example, a linear or a non-linear normalization as described above.

In operation 312, weights for the adjusters are determined using the principal component. Weights may be used with the equation:

$$Gray = Rw_1 + Gw_2 + Bw_3$$

to generate a grayscale image. The weights w are the weights applied to the adjusters 106, for example. According to another embodiment, a six-channel mixer may use a 3-way PCA to determine weights for the adjusters. For example, the red, blue, and green components of the principal component may be given by $c_r$, $c_g$, and $c_b$ respectively. The components of the principal component may be used to determine the weights applied to the adjusters. For example, when using an RGB image with red, green, blue, yellow, cyan, and magenta adjusters in the six channel mixer, the weights for the red, green, and blue adjusters may be given by $c_r$, $c_g$, and $c_b$ respectively. The weight for the yellow adjuster may then be given by the complement of the blue component (e.g., $1-c_b$). The weight for the cyan adjuster may be given by the complement of the red component (e.g., $1-c_r$). The weight for the magenta adjuster may be given by the complement of the green component (e.g., $1-c_g$). According to an example, after the components of the principal component are normalized, their sum may be equal to 1. The sum of the weights of the yellow, cyan, and magenta weights may also, by definition, be equal to one. In operation 314, the weights may be applied to the channel mixer.

Six-Way Principal Component Analysis

Figure 4A:
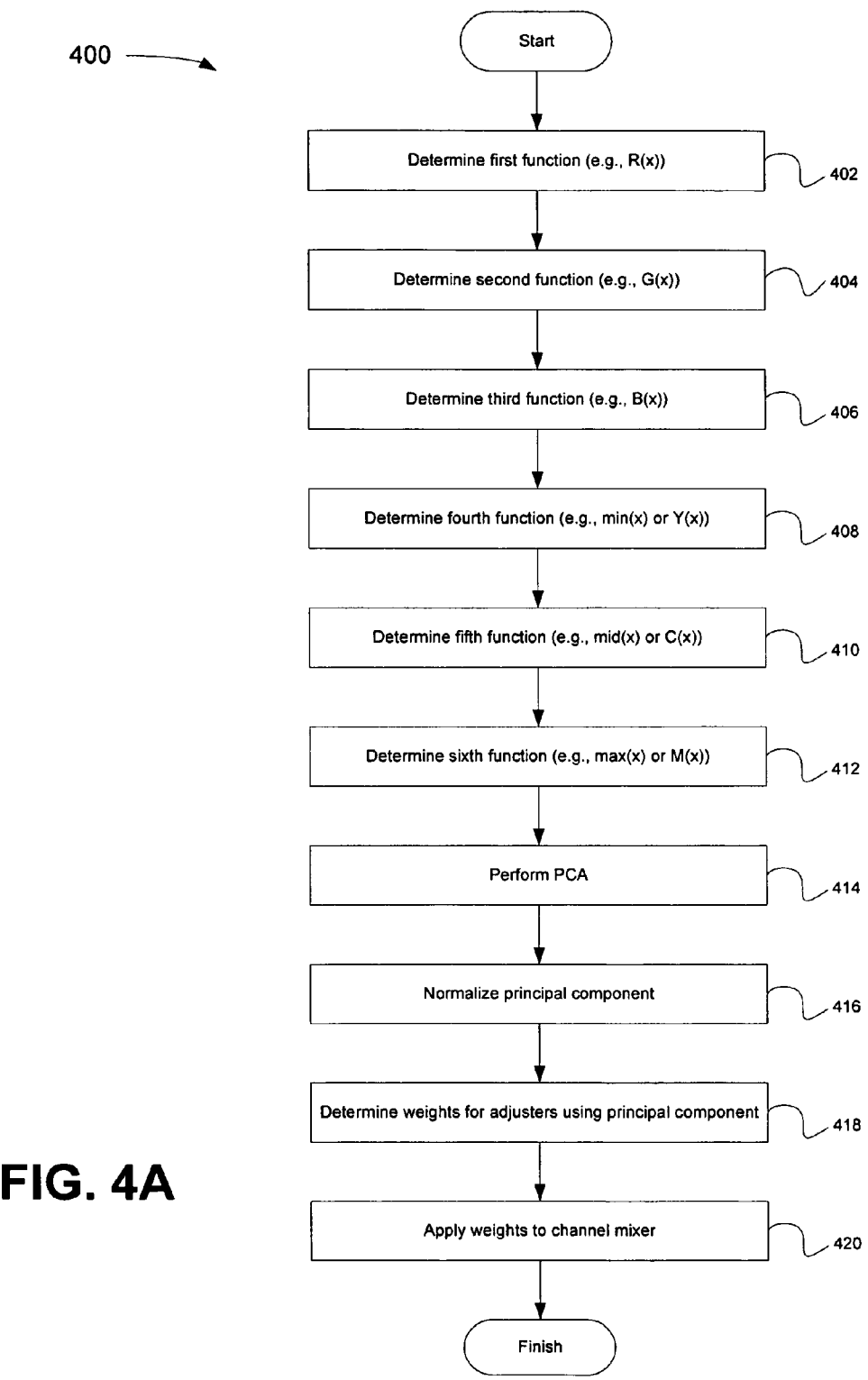
FIG. 4A is a flowchart describing a process for performing a six-way PCA for an image according to various examples.

FIG. 4A is a flowchart describing a process 400 for performing a six-way PCA for an image according to various examples. Six functions may be determined in operations 402-412 to provide data for the PCA. As described above, the PCA may return multiple principal components. For example, with a six-way PCA, the PCA may return six principal components. The "principal component," used herein, may refer to a principal component selected for determining the weights of the adjusters. For example, the principal component having the largest eigenvalue may be selected. Two examples are described here, each with different sets of functions for the PCA. The first example may include the following six functions and corresponding components for the PCA:

| Function | Component |
|---|---|
| R(x) (red value of the pixel x) | $c_r$ |
| G(x) (green value of the pixel x) | $c_g$ |
| B(x) (blue value of the pixel x) | $c_b$ |
| Min(x) (minimum intensity value in the pixel x) | $c_{min}$ |
| Mid(x) (middle intensity value in the pixel x) | $c_{mid}$ |
| Max(x) (maximum intensity value in the pixel x) | $c_{max}$ |

The min(x), mid(x), and max(x) functions each choose one value from each pixel. For example, the min(x) function selects the intensity value of the red, green, and blue values that has the lowest intensity. The principal component returned by the PCA may be a vector of the form ($c_r$, $c_g$, $c_b$, $c_{min}$, $c_{mid}$, $c_{max}$). The components of the vector may be used to determine the weights to apply to the adjusters.

According to a second example, the following six functions may be used with the PCA:

| Function | Component |
|---|---|
| R(x) (red value of the pixel x) | $c_r$ |
| G(x) (green value of the pixel x) | $c_g$ |
| B(x) (blue value of the pixel x) | $c_b$ |
| Y(x) = min(r,g) | $c_y$ |
| C(x) = min(g,b) | $c_c$ |
| M(x) = min(b,r) | $c_m$ |

The functions Y(x), C(x), and M(x) correspond to functions for the yellow, cyan, and magenta adjusters respectively. For example, the yellow intensity value for a pixel x is the smaller of the intensity of the red and green values for that pixel. The principal component returned by the PCA may be a vector of the form ($c_r$, $c_g$, $c_b$, $c_y$, $c_c$, $c_m$).

In operation 414, a PCA is performed using the functions determined in operations 402-412. The PCA may return the principal component having the components shown in the tables above, for example. In operation 416, the principal component may be normalized. The normalization may be performed using a linear or a non-linear normalization, as described above. For example, using the principal component shown in the second table, the normalization may be performed by solving an equation of the form:

$$c_r' + c_g' + c_b' + c_c' + c_m' = 1$$

Where $$c_r' = \frac{c_r}{c_r + c_g + c_b + c_y + c_c + c_m},$$

$$c_g' = \frac{c_g}{c_r + c_g + c_b + c_y + c_c + c_m},$$

and so on. $c_r'$, $c_g'$, $c_b'$, $c_y'$, $c_c'$, and $c_m'$ may be the normalized components forming a normalized principal component. The left side of the equation may be set equal to any constant value. Alternatively, a non-linear normalization may be performed by solving the above equation where $c_r' = c_r^2$, $c_g' = c_g^2$, $c_b' = c_b^2$, $c_y' = c_y^2$, $c_c' = c_c^2$, and $c_m' = c_m^2$.

In operation 418, the weights for the adjusters are determined. According to various examples, the weights may be determined for the first example by summing the components of the principal component as in this table:

| Adjuster | Weight |
|---|---|
| Red | $c_r' + c_{max}'$ |
| Yellow | $c_r' + c_g' + c_{mid}' + c_{max}'$ |
| Green | $c_g' + c_{max}'$ |
| Cyan | $c_g' + c_b' + c_{mid}' + c_{max}'$ |
| Blue | $c_b' + c_{max}'$ |
| Magenta | $c_b' + c_r' + c_{mid}' + c_{max}'$ | where $c_{max}'$, $c_{mid}'$, and $c_{min}'$ are normalized components of the principal component. The weights may be determined for the second example by summing the components as in this table:

| Adjuster | Weight |
| --- | --- |
| Red | $c_r'$ |
| Yellow | $c_r' + c_g' + c_y'$ |
| Green | $c_g'$ |
| Cyan | $c_g' + c_b' + c_c'$ |
| Blue | $c_b'$ |
| Magenta | $c_b' + c_r' + c_m'$ |

Although normalized components are shown, it is understood that normalization is optional.

In operation 420, the weights are applied to the adjusters, and the image is automatically adjusted for the user. The image may then be converted to a grayscale image.

Figure 4B:
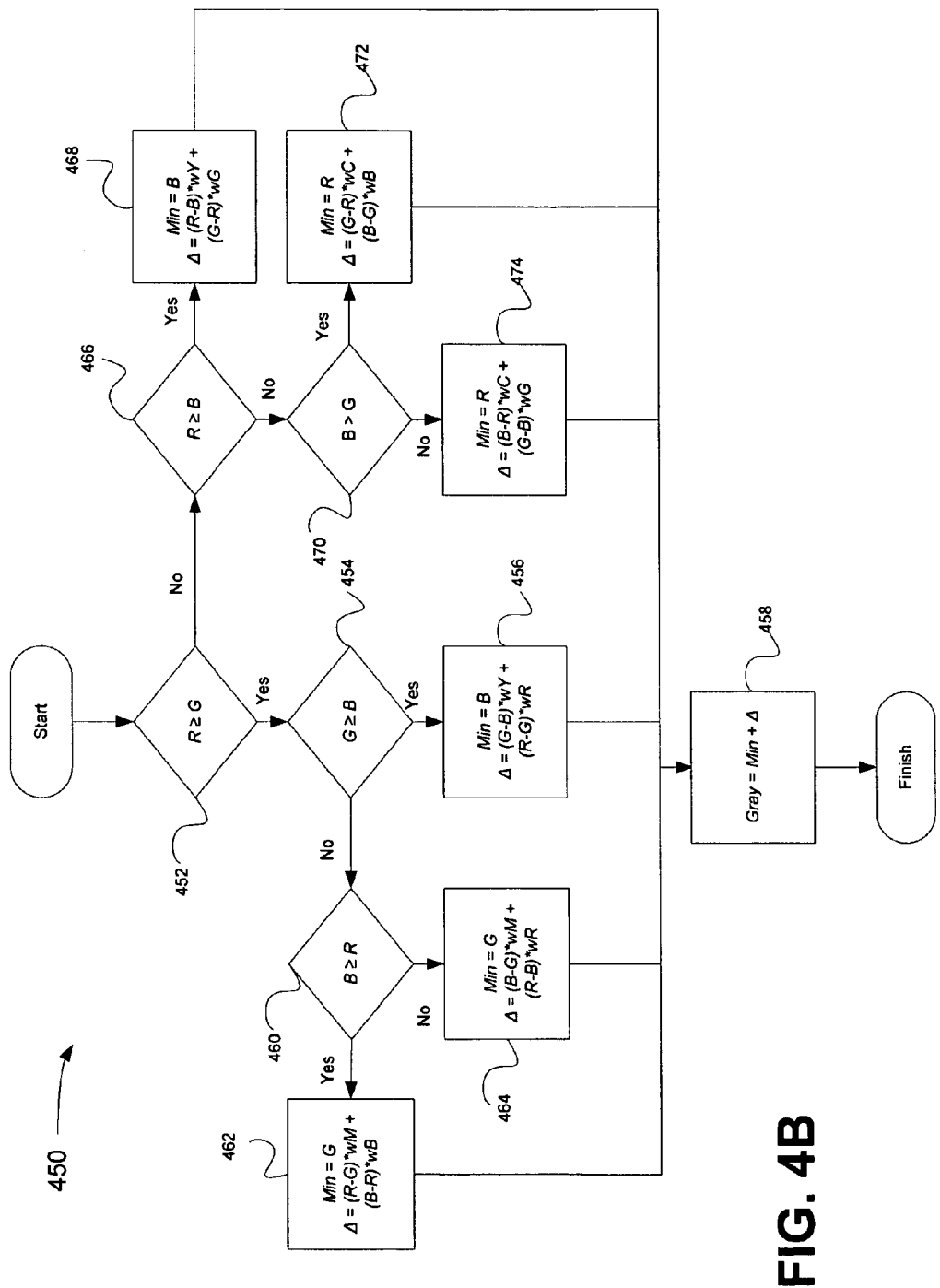
FIG. 4B is a flowchart describing a process for converting a color image to a grayscale image using weights determined from a PCA according to various examples.

FIG. 4B is a flowchart describing a process 450 for converting a color image to a grayscale image using weights determined from a PCA according to various examples. The process 450 may use an RGB image having red, green, and blue intensity values for the pixels of the image. For example, color data for a pixel may be given as (R, G, B), where R is the red intensity value (e.g., 0 to 255) of the pixel (the "red value"), G is the green intensity value of the pixel (the "green value"), and B is the blue intensity value of the pixel (the "blue value"). Although an RGB scheme is described here, it is understood that various other color spaces may be used with the examples.

According to various examples, a color pixel, for example, a three-dimensional RGB pixel, may be converted to a one-dimensional gray pixel using the process 450. The process 450 may be used to convert a color image to a grayscale image with the weights determined using a PCA, such as the examples described regarding FIG. 4A. A minimum intensity value and a delta value for a color pixel may be determined. The minimum intensity value is the value of the smallest of the red, green, or blue values. The delta value is an additional intensity value added to the minimum intensity value to determine the gray intensity value of the pixel. A gray value may be a one-dimensional intensity value for a pixel, for example from 0 to 255.

A color may be described by a hue angle. A hue angle may be an angle between 0° and 360° that may describe a hue of a color. For example, a hue angle may be used to describe a mix of the three primary colors red, green, and blue. According to various examples shown here, sixty degree hue angle ranges may represent various cases for determining a gray conversion of a color pixel. For example, a first case may represent the hue angles between 0° and 60° where red is the dominant color, green is the secondary color, and blue is the minimum color.

In operation 452, it is determined whether the red value is greater than the green value. If the red value is greater than the green value, in operation 454, it is determined whether the green value is greater than the blue value. If the green value is greater than the blue value, then, in operation 456, the minimum value is set equal to the blue value, and the delta value is given by $\Delta=(G-B)*w_y+(R-G)*w_r$, where $\Delta$ is the delta value, G is the green value, B is the blue value, R is the red value, $w_y$ is the yellow weight, and $w_r$ is the red weight. In this case, the hue angle of the color of the pixel may be between 0° and 60° (i.e., $R \geq G \geq B$). The weights for various colors may be the weights applied to the adjusters that were determined using a PCA, as described in FIG. 4A. In operation 458, the gray intensity value for the pixel may be determined by summing the minimum value and the delta value.

If, in operation 454, the green value is not greater than or equal to the blue value, in operation 460, it is determined whether the blue value is greater than or equal to the red value. If the blue value is greater than or equal to the red value, in operation 462, the minimum value is set equal to the green value, and the delta value is given by $\Delta=(R-G)*w_m+(B-R)*w_b$, where $w_m$ and $w_b$ are the magenta and blue weights, respectively. In this case, the hue angle of the color of the pixel may be between 240° and 300° (i.e., $B \geq R \geq G$). The process 450 then continues to operation 458, where the gray intensity is determined by summing the minimum value and the delta value.

If, in operation 460, it is determined that the blue value is not greater than or equal to the red value, in operation 464, the minimum value is set equal to the green value, and the delta value is given by $\Delta=(B-G)*w_m+(R-B)*w_r$. In this case, the hue angle of the color of the pixel may be between 300° and 360° (i.e., R>B>G). The process 450 continues to operation 458, where the gray intensity is determined by summing the minimum value and the delta value.

If, in operation 452, it is determined that the red value is not greater than or equal to the green value, in operation 466 it is determined whether the red value is greater than or equal to the blue value. If the red value is greater than or equal to the blue value, in operation 468, the minimum value is set equal to the blue value, and the delta value is given by $\Delta=(R-B)*w_y+(G-R)*w_g$, where $w_g$ is the green weight. In this case, the hue angle of the color of the pixel may be between 60° and 120° (i.e., $G>R \geq B$). The process 450 then continues to operation 458, where the gray intensity is determined by summing the minimum value and the delta value.

If, in operation 466, the red value is not greater than or equal to the blue value, in operation 470, it is determined whether the blue value is greater than the green value. If the blue value is greater than the green value, in operation 472, the minimum value is set equal to the red value, and the delta value is given by $\Delta=(G-R)*w_c+(B-G)*w_b$, where $w_c$ is the cyan weight. In this case, the hue angle of the color of the pixel may be between 180° and 240° (i.e., B>G>R). The process 450 then continues to operation 458, where the gray intensity is determined by summing the minimum value and the delta value.

If, in operation 470, it is determined that the blue value is not greater than the green value, in operation 474, the minimum value is set equal to the red value, and the delta value is given by $\Delta=(B-R)*w_c+(G-B)*w_g$. In this case, the hue angle of the color of the pixel may be between 120° and 180° (i.e., $G \geq B>R$). The process proceeds to operation 458, where the gray intensity is determined by summing the minimum value with the delta value.

Similar techniques may be used for images processed with other types of PCAs. For example, an eight-way or a four-way PCA may be used with a similar process. Generally, a minimum pixel intensity value may be summed with a delta value based on weights given by the PCA. Various other techniques may also be used to convert a color image to a grayscale image using PCA.

An Exemplary Computer System

Figure 5:
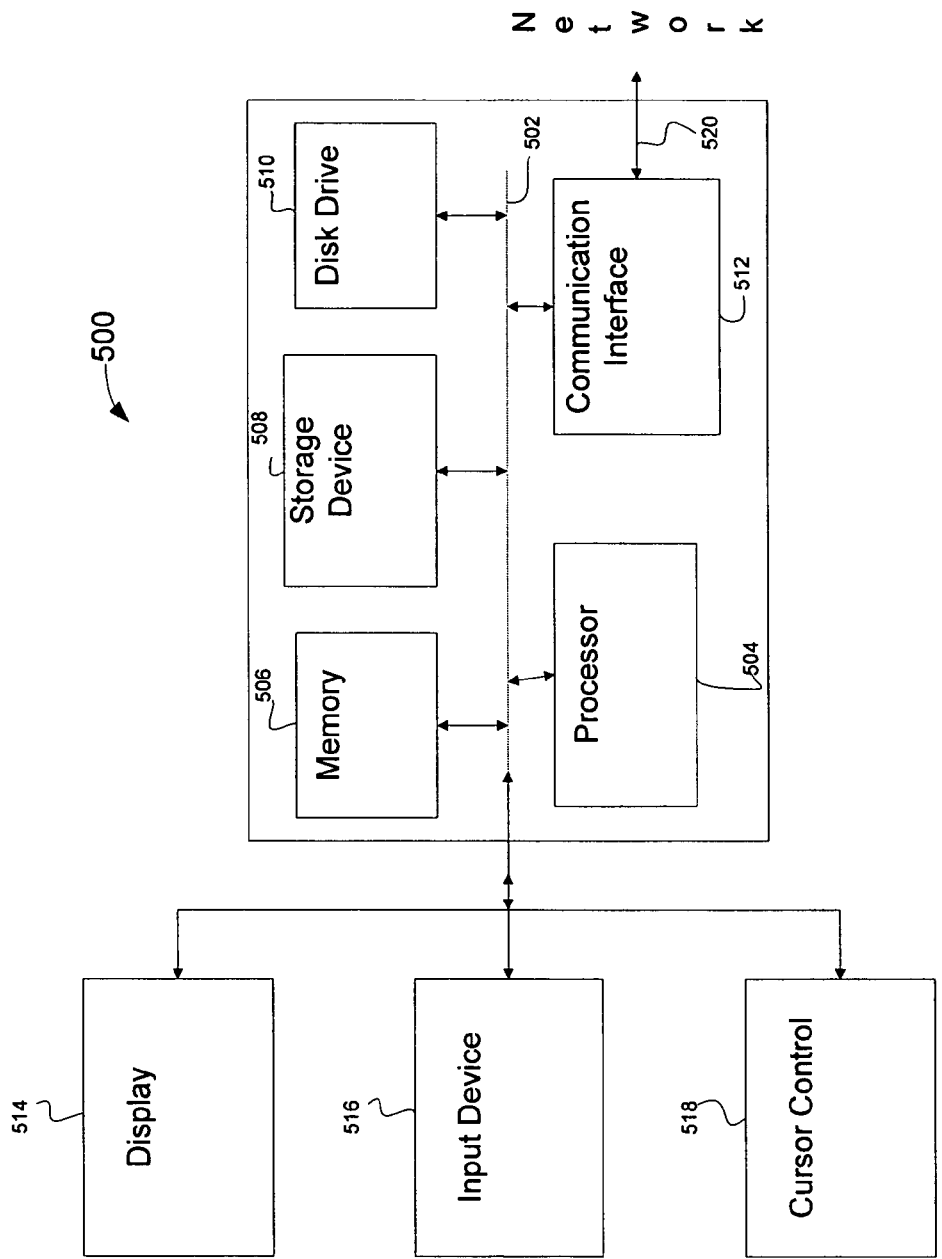
FIG. 5 is a block diagram illustrating an exemplary computer system suitable for automatic image adjustment, in accordance with various examples.

FIG. 5 is a block diagram illustrating an exemplary computer system suitable for automatic image adjustment, in accordance with various examples. In some examples, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some examples, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some examples, hard-wired circuitry may be used in place of or in combination with software instructions to implement various examples.

Although the foregoing examples have been described in some detail for purposes of clarity of understanding, the examples are not limited to the details provided. There are many alternative ways of implementing the examples. The disclosed examples are illustrative and not restrictive.

What is claimed:

1. A method, comprising:
    performing, by a computer, a principal component analysis (PCA) on an image for a plurality of values of the image to determine a principal component;
    normalizing, by the computer, the principal component to obtain a normalized principal component; and
    generating, by the computer, another image by mapping the plurality of values using the normalized principal component.

2. The method of claim 1, wherein the normalizing is performed before the generating.

3. The method of claim 1, wherein normalizing comprises performing a linear normalization.

4. The method of claim 3, wherein normalizing comprises solving an equation comprising a sum of a component of the principal component and at least one another component of the principal component set equal to a constant value.

5. The method of claim 1, wherein normalizing comprises performing a non-linear normalization.

6. The method of claim 5, wherein normalizing comprises solving an equation comprising a sum of a first square of a component of the principal component and at least a second square of another component of the principal component set equal to a constant value.

7. The method of claim 5, wherein normalizing comprises solving an equation comprising a sum of a first product of a component of the principal component and a first absolute value of the component and at least a second product of another component of the principal component and a second absolute value of the another component set equal to a constant value.

8. The method of claim 1, wherein mapping comprises generating a grayscale image by mapping the principal component to the plurality of values.

9. The method of claim 1, wherein performing a PCA comprises performing a three-way PCA.

10. The method of claim 1, wherein performing a PCA comprises performing a six-way PCA.

11. The method of claim 1, wherein performing a PCA comprises performing a PCA using a subset of the plurality of values.

12. A method, comprising:
    performing a principal component analysis (PCA) on an image to determine a principal component;
    applying a plurality of weights based on the principal component to a channel mixer; and
    generating a grayscale image from the plurality of weights using the channel mixer.

13. The method of claim 12, wherein performing the PCA comprises performing a three-way PCA.

14. The method of claim 13, further comprising:
    determining a red weight using a red function with the PCA, the red function comprising a plurality of red values of the image;
    determining a green weight using a green function with the PCA, the green function comprising a plurality of green values of the image;
    determining a blue weight using a blue function with the PCA, the blue function comprising a plurality of blue values of the image; and
    applying the red weight, the green weight, the blue weight to the channel mixer.

15. The method of claim 14, further comprising:
    determining a yellow weight that is a complement of the red weight;
    determining a cyan weight that is a complement of the green weight;
    determining a magenta weight that is a complement of the blue weight; and
    applying the cyan weight, and the magenta weight to the channel mixer.

16. The method of claim 12, further comprising:
    normalizing the principal component to obtain a plurality of normalized components of the principal component; and
    wherein applying the plurality of weights comprises applying the plurality of weights based on the plurality of normalized components.

17. The method of claim 12, wherein performing the PCA comprises performing a six-way PCA.

18. The method of claim 17, wherein performing the PCA comprises:
    determining a red value, a green value, and a blue value for a pixel of the image; and
    determining a red function comprising the red value, a green function comprising the green value, and a blue function comprising the blue value.

19. The method of claim 18, further comprising:
    determining a yellow function comprising a first minimum of the red value and the green value;
    determining a cyan function comprising a first minimum of the green value and the blue value;
    determining a magenta function comprising a first minimum of the blue value and the red value;
    determining the principal component using the red function, the green function, the blue function, the yellow function, the cyan function, and the magenta function; and
    wherein the principal component comprises a red component, a green component, and a blue component, a yellow component, a cyan component, and a magenta component.

20. The method of claim 18, further comprising:
    determining a maximum function comprising a maximum value of the red value, the green value, and the blue value;
    determining a middle function comprising a middle value of the red value, the green value, and the blue value;
    determining a minimum function comprising a minimum value of the red value, the green value, and the blue value;
    determining the principal component using the red function, the green function, the blue function, the maximum function, the middle function, and the minimum function; and wherein the principal component comprises a red component, a green component, and a blue component, a maximum component, a middle component, and a minimum component.

21. The method of claim 20, further comprising:
determining a red weight comprising a first sum of the red component and the maximum component;
determining a yellow weight comprising a second sum of the red component, the green component, the middle component, and the maximum component;
determining a green weight comprising a third sum of the green component and the maximum component;
determining a cyan weight comprising a fourth sum of the green component, the blue component, the middle component and the maximum component;
determining a blue weight comprising a fifth sum of the blue component and the maximum component;
determining a magenta weight comprising a sixth sum of the blue component, the red component, the middle component, and the maximum component; and
applying the red weight, the green weight, the blue weight, the yellow weight, the cyan weight, and the magenta weight to the channel mixer.

22. The method of claim 19, further comprising:
determining a red weight comprising the red component;
determining a yellow weight comprising a first sum of the red component, the green component, and the yellow component;
determining a green weight comprising the green component;
determining a cyan weight comprising a second sum of the green component, the blue component, and the cyan component;
determining a blue weight comprising the blue component;
determining a magenta weight comprising a third sum of the blue component, the red component, and the magenta component; and
applying the red weight, the green weight, the blue weight, the yellow weight, the cyan weight, and the magenta weight to the channel mixer.

23. A system, comprising:
a memory configured to generate a grayscale image; and
a processor configured to:
perform a principal component analysis (PCA) on an image to determine a principal component;
apply a plurality of weights based on the principal component to a channel mixer; and
generate a grayscale image from the plurality of weights using the channel mixer.

24. The system of claim 23, the processor being further configured to:
determine a red weight using a red function with the PCA, the red function comprising a plurality of red values of the image;
determine a green weight using a green function with the PCA, the green function comprising a plurality of green values of the image;
determine a blue weight using a blue function with the PCA, the blue function comprising a plurality of blue values of the image; and
apply the red weight, the green weight, the blue weight to the channel mixer.

25. The system of claim 24, the processor being further configured to:
determine a yellow weight that is a complement of the red weight;
determine a cyan weight that is a complement of the green weight;
determine a magenta weight that is a complement of the blue weight; and
apply the cyan weight, and the magenta weight to the channel mixer.

26. The system of claim 23, the processor being further configured to:
normalize the principal component to obtain a plurality of normalized components of the principal component; and
apply the plurality of weights based on the plurality of normalized components.

27. The system of claim 23, the processor being further configured to perform a six-way PCA.

28. The system of claim 27, the processor being further configured to:
determine a red value, a green value, and a blue value for a pixel of the image; arid
determine a red function comprising the red value, a green function comprising the green value, and a blue function comprising the blue value.

29. The system of claim 28, the processor being further configured to:
determine a yellow function comprising a first minimum of the red value and the green value;
determine a cyan function comprising a first minimum of the green value and the blue value;
determine a magenta function comprising a first minimum of the blue value and the red value;
determine the principal component using the red function, the green function, the blue function, the yellow function, the cyan function, and the magenta function; and
wherein the principal component comprises a red component, a green component, and a blue component, a yellow component, a cyan component, and a magenta component.

30. The system of claim 28, the processor being further configured to:
determine a maximum function comprising a maximum value of the red value, the green value, and the blue value;
determine a middle function comprising a middle value of the red value, the green value, and the blue value;
determine a minimum function comprising a minimum value of the red value, the green value, and the blue value;
determine the principal component using the red function, the green function, the blue function, the maximum function, the middle function, and the minimum function; and
wherein the principal component comprises a red component, a green component, and a blue component, a maximum component, a middle component, and a minimum component.

31. The system of claim 30, the processor being further configured to:
determine a red weight comprising a first sum of the red component and the maximum component;
determine a yellow weight comprising a second sum of the red component, the green component, the middle component, and the maximum component;
determine a green weight comprising a third sum of the green component and the maximum component;
determine a cyan weight comprising a fourth sum of the green component, the blue component, the middle component and the maximum component;

determine a blue weight comprising a fifth sum of the blue component and the maximum component;

determine a magenta weight comprising a sixth sum of the blue component, the red component, the middle component, and the maximum component; and apply the red weight, the green weight, the blue weight, the yellow weight, the cyan weight, and the magenta weight to the channel mixer.

32. A non-transitory computer-readable medium comprising computer instructions for:

performing a principal component analysis (PCA) on an image to determine a principal component;

applying a plurality of weights based on the principal component to a channel mixer; and generating a grayscale image from the plurality of weights using the channel mixer.

33. The non-transitory computer-readable medium of claim 32, the computer instructions further comprising:

determining a red weight using a red function with the PCA, the red function comprising a plurality of red values of the image;

determining a green weight using a green function with the PCA, the green function comprising a plurality of green values of the image;

determining a blue weight using a blue function with the PCA, the blue function comprising a plurality of blue values of the image; and applying the red weight, the green weight, the blue weight to the channel mixer.

34. The non-transitory computer-readable medium of claim 33, the computer instructions further comprising:

determining a yellow weight that is a complement of the red weight;

determining a cyan weight that is a complement of the green weight;

determining a magenta weight that is a complement of the blue weight; and applying the cyan weight, and the magenta weight to the channel mixer.

35. The non-transitory computer-readable medium of claim 32, the computer instructions further comprising:

normalizing the principal component to obtain a plurality of normalized components of the principal component; and wherein applying the plurality of weights comprises applying the plurality of weights based on the plurality of normalized components.

36. The non-transitory computer-readable medium of claim 32, wherein performing the PCA comprises performing a six-way PCA.

37. The non-transitory computer-readable medium of claim 36, wherein performing the PCA comprises:

determining a red value, a green value, and a blue value for a pixel of the image; and determining a red function comprising the red value, a green function comprising the green value, and a blue function comprising the blue value.

38. The non-transitory computer-readable medium of claim 37, the computer instructions further comprising:

determining a yellow function comprising a first minimum of the red value and the green value;

determining a cyan function comprising a first minimum of the green value and the blue value;

determining a magenta function comprising a first minimum of the blue value and the red value;

determining the principal component using the red function, the green function, the blue function, the yellow function, the cyan function, and the magenta function; and wherein the principal component comprises a red component, a green component, and a blue component, a yellow component, a cyan component, and a magenta component.

39. The non-transitory computer-readable medium of claim 37, the computer instructions further comprising:

determining a maximum function comprising a maximum value of the red value, the green value, and the blue value;

determining a middle function comprising a middle value of the red value, the green value, and the blue value;

determining a minimum function comprising a minimum value of the red value, the green value, and the blue value;

determining the principal component using the red function, the green function, the blue function, the maximum function, the middle function, and the minimum function; and wherein the principal component comprises a red component, a green component, and a blue component, a maximum component, a middle component, and a minimum component.

40. The non-transitory computer-readable medium of claim 39, the computer instructions further comprising:

determining a red weight comprising a first sum of the red component and the maximum component;

determining a yellow weight comprising a second sum of the red component, the green component, the middle component, and the maximum component;

determining a green weight comprising a third sum of the green component and the maximum component;

determining a cyan weight comprising a fourth sum of the green component, the blue component, the middle component and the maximum component;

determining a blue weight comprising a fifth sum of the blue component and the maximum component;

determining a magenta weight comprising a sixth sum of the blue component, the red component, the middle component, and the maximum component; and applying the red weight, the green weight, the blue weight, the yellow weight, the cyan weight, and the magenta weight to the channel mixer.

* * * * *

UNITED STATES PATENT AND TRADEMARK OFFICE
CERTIFICATE OF CORRECTION

| | | |
|---|---|---|
| PATENT NO. | : 8,086,029 B1 | Page 1 of 1 |
| APPLICATION NO. | : 11/638781 | |
| DATED | : December 27, 2011 | |
| INVENTOR(S) | : Jen-Chan Chien et al. | |

It is certified that error appears in the above-identified patent and that said Letters Patent is hereby corrected as shown below:

Claim 28, col. 14, line 19, please delete "arid" and insert --and-- in place thereof.

Signed and Sealed this
Thirteenth Day of March, 2012

David J. Kappos
*Director of the United States Patent and Trademark Office*